Sept. 22, 1964 J. V. DAVIS 3,149,581
CARRIER STOP MECHANISM
Filed Nov. 5, 1962 2 Sheets-Sheet 1
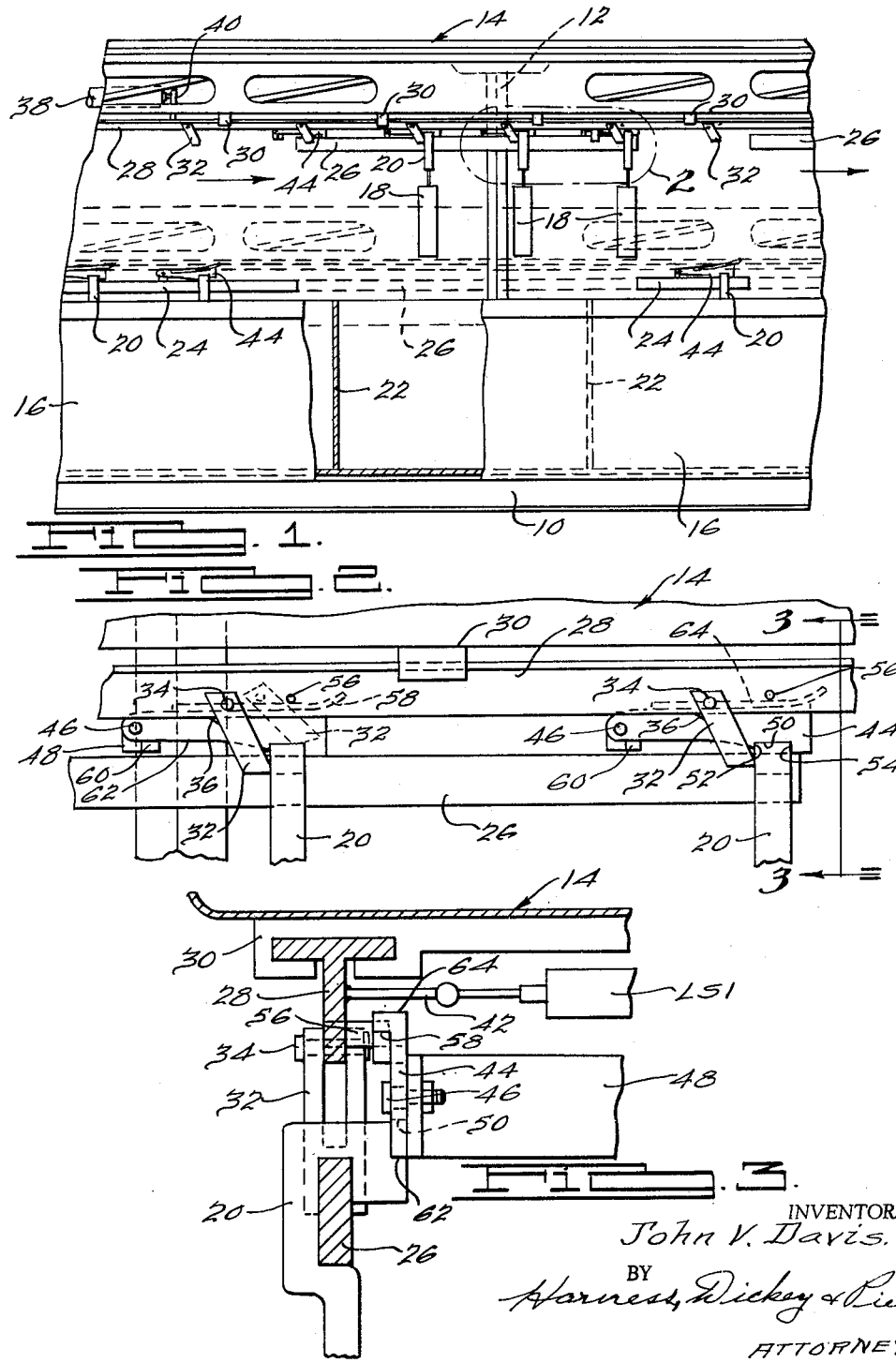
INVENTOR.
John V. Davis.
BY
Harness, Dickey & Pierce
ATTORNEYS.

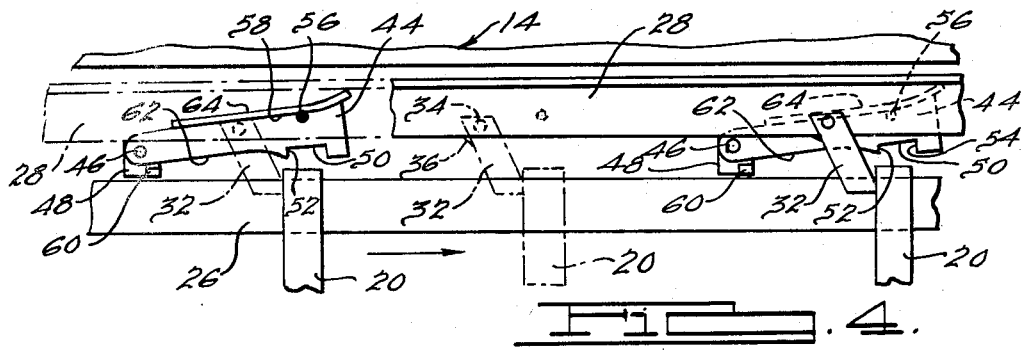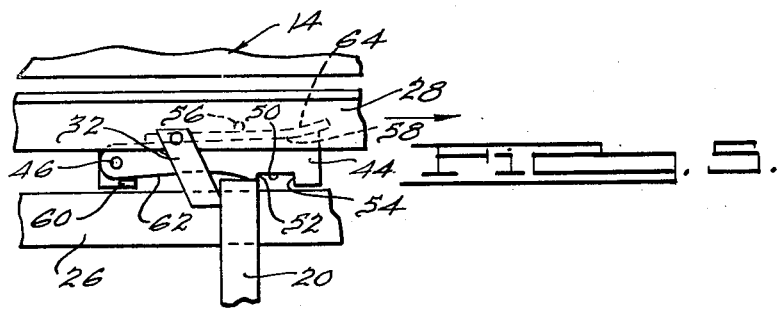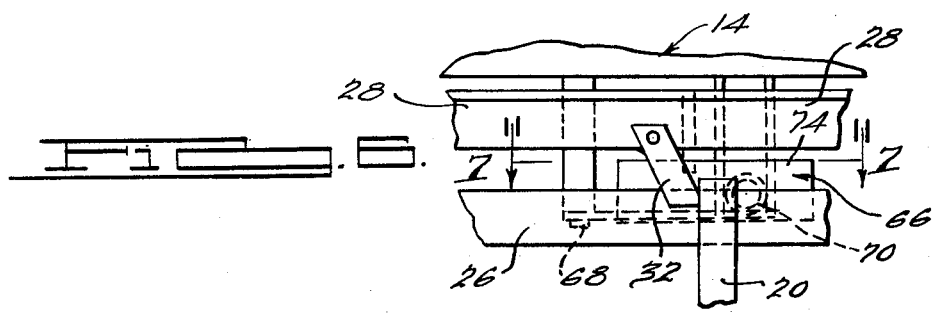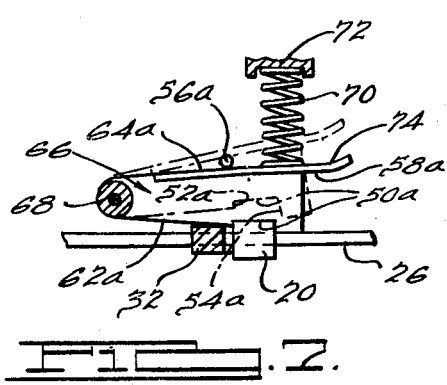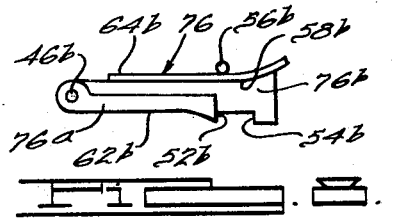

United States Patent Office 3,149,581
Patented Sept. 22, 1964

3,149,581
CARRIER STOP MECHANISM
John V. Davis, Grosse Pointe Farms, Mich., assignor to
The Udylite Corporation, Detroit, Mich., a corporation
of Delaware
Filed Nov. 5, 1962, Ser. No. 235,304
8 Claims. (Cl. 104—162)

The present invention broadly relates to conveying apparatus and more particularly to an improved mechanism for engaging and maintaining a work carrier at a preselected position along a supporting rail preventing inadvertent or undesirable rearward or forward travel thereof from that position until the next controlled advancing movement.

Conveying apparatuses of the general type to which the present invention is applicable, are in widespread use in industry for handling material and particularly for conveying material through a preselected treating sequence of a series of work stations. Conventionally, the work carriers are intermittently advanced from one work station to the next work station at which they are held for a preselected time period sufficient complete the prescribed treatment or work operation on the workpieces. In order to achieve improved efficiency in the handling of workpieces, it is desirable to advance the work carriers from one work station to the next work station as fast as possible. In many instances, the momentum imparted to the work carrier and the workpieces suspended therefrom causes the work carrier to travel past the prescribed stopping position either effecting a clashing of the work carrier and workpieces thereon with the attendant processing or treating equipment or alternatively, misaligning the workpieces with the treatment station such that manual realignment is required.

The foregoing problem has been somewhat alleviated by various stop mechanisms such as the mechanisms disclosed in United States Patent No. 2,897,010 granted to Choma on June 6, 1961 and United States Patent No. 2,988,014 granted to Pianowski on June 13, 1961, each of which patents are assigned to the assignee of the present invention. The carrier stop devices as shown and described in the aforementioned patents are suitable only for preventing over-travel of the work carriers due to their momentum. Since some vibration is usually associated with various treatment processes, there has been a tendency for the work carriers to drift from their stop positions along the rail to misaligned positions spaced from their original advanced positions during the course of a treating operation. This fact is further aggravated when the supporting rails on which the work carriers are mounted are not in a true horizontal position which causes the carriers to move downhill therealong away from the preselected stopping position. The rearward drag of the carrier transfer mechanism against the carrier during its retracting movement in some instances also effects a misalignment of the work carrier along the supporting rail. Manual manipulation of the carriers at the loading and unloading stations as well as at the treating stations for testing or replenishing the treating solutions can result in inadvertent misalignment or close stacking of the carriers producing interference and clashing therebetween which is overcome in accordance with the positive stopping device comprising the present invention.

Such undesirable or inadvertent rearward or forward travel of the work carriers from a preselected position along a supporting rail is particularly critical when the workpieces are being subjected to an electroplating operation, for example, wherein the workpieces are lowered into a treating receptacle incorporating a nested anode configuration to achieve the desired plating thickness on the various surfaces of the workpieces. The movement of the work carrier to a misaligned position under such circumsatnces frequently causes an unevenness of plating thickness on different portions of the workpieces or an excessive or insufficient treatment of different portions of the workpieces when other treating operations are being performed.

A further difficulty arises through inadvertent movement of the work carriers when supporting rails of a sectionalized construction are employed wherein certain sections of the supporting rail are movable to and from a lowered position and a raised position for lifting the workpieces above the treating stations in order that they may be advanced in an unobstructed manner to the next adjacent treating station. In this instance, the inadvertent movement of a work carrier to a position bridging two adjacent sections of the supporting rail may cause conflict and interference with the relative movement of the various rail sections. In some instances, the inadvertent movement of a work carrier beyond the end of a lower fixed rail section has effected severe clashing upon subsequent lowering of the next adjacent movable rail section which is adapted to be positioned with its end in contiguous alignment with the fixed rail section when in the lowered position.

The foregoing problems which arise as a result of the inadvertent movement or drift of the work carriers along the supporting rail or supporting rail sections are overcome in accordance with the carrier top mechanism comprising the present invention which positively locks the work carrier in the predetermined advanced position and maintains the work carrier in that position for substantially the entire duration of treatment at that station.

It is, accordingly, a primary object of the present invention to provide a carrier stop mechanism which overcomes the problems and disadvantages associated with conveying apparatus as a result of work carrier drift and misalignment along the supporting rails thereof.

Another object of the present invention is to provide an improved carrier stop mechanism which prevents forward or rearward drift of a work carrier during a processing step from a predetermined advanced position in spite of any vibrational or longitudinal forces acting on the workpieces suspended therefrom.

Still another object of the present invention is to provide an improved carrier stop mechanism which is mechanically actuable and operable in accordance with the preselected automatic sequence of the conveying machine on which it is mounted obviating the necessity of incorporating supplementary control systems which must be integrated and coordinated with the control sequence of the principal conveying machine.

A further object of the present invention is to provide an improved carrier stop mechanism which is of simple design and durable operation, which can be readily incorporated on new conveying apparatus or simply added to existing equipment without necessitating extensive modification thereof, and which is of economical manufacture, installation and use.

Other objects, features, and advantages of the present invention will become apparent from the subsequent description, taken in conjunction with the accompanying drawings wherein:

FIGURE 1 is a fragmentary side elevation view of an exemplary conveying machine to which the present invention is applicable and showing portions thereof in section;

FIG. 2 is an enlarged fragmentary side elevation view of the transfer mechanism and carrier stop mechanism of the conveying machine shown in FIGURE 1 and encircled in the area indicated at 2;

FIG. 3 is a transverse sectional view of the transfer means and supporting rail section provided with a carrier stop mechanism as shown in FIGURE 2 and taken along the line 3—3 thereof;

FIG. 4 is a fragmentary side elevation view similar to FIGURE 2 but illustrating the carrier stop mechanisms in a clearance position and with the pusher bar in the fully retracted position preparatory to the next advancing movement;

FIG. 5 is a fragmentary side elevation view of the right end portion of the conveying machine shown in FIGURE 4 wherein the pusher bar and work carrier have been advanced to a position approaching the fully advanced position thereof;

FIG. 6 is a fragmentary side elevation view of an alternate satisfactory embodiment of a carrier stop mechanism from that shown in FIGURES 1–5;

FIG. 7 is a fragmentary horizontal sectional view of the carrier stop mechanism shown in FIGURE 6 and taken along the line 7—7 thereof; and FIG. 8 is a side elevation view of still another alternate satisfactory embodiment of the present invention.

Referring now in detail to the drawings and as may be best seen in FIGURE 1, a conveying machine is fragmentarily shown of the general type to which the present invention is applicable. The conveying machine shown is of the type disclosed in United States Reissue Patent No. 24,072 granted to John V. Davis on October 11, 1955, and assigned to the same assignee as the present invention. Conveying machines of this type are conventionally employed for transferring a plurality of workpieces through a series of treating stations in a prescribed sequentially phased cycle.

The conveying machine as shown in FIGURE 1 and as more fully described in the aforementioned United States Reissue Patent 24,072 to which reference is made for a more detailed description thereof, comprises a frame including a series of base members 10 to which a series of upright central columns 12 are securely fastened providing support and guidance for an elevator chassis 14 which is movably mounted thereon and movable from a raised position as shown in solid lines in FIGURE 1 to a lowered position as shown in phantom. A series of aligned treating receptacles or tanks 16 are supported on the base members 10 and extend longitudinally of the conveying machine. The conveying machine may be of the straight-through type wherein the workpieces are conveyed from one end thereof through the treating tanks 16 and removed from the opposite end thereof or alternatively, may be of the turn-around type wherein the workpieces are conveyed in a continuous loop from a load station around the machine to an unload station. In either event, the work racks such as the racks 18 suspended from a series of work carriers 20 must be periodically raised by the elevating movement of the elevator chassis 14 in order to enable the advancement thereof over the partitions 22 separating adjoining tanks 16 to the next adjacent treating tank.

The work carriers 20 and the work racks 18 suspended therefrom are movably supported on a series of fixed rail sections 24 stationarily mounted over the treating tanks 16 and a series of movable rail sections 26 connected to the underside of the elevator chassis 14 and movable thereby to and from a lowered position in alignment with the ends of the fixed rail sections 24 to a raised position as shown in FIGURE 1. The advancement of the work carriers 20 in the direction of the arrow as shown in FIGURE 1, along the fixed rail sections 24 and the movable rail sections 26 is achieved in the exemplary machine shown in the drawings by a reciprocable transfer mechanism such as a pusher bar 28 of a T-shaped cross section which is slidably supported in a series of guide shoes 30 affixed to the underside of the elevator chassis framework. The pusher bar 28 is provided with a series of longitudinally spaced dogs or pushers 32 which are pivotally connected to the depending web portion thereof by means of pins 34 and extend downwardly therefrom and are adapted to engage and advance the work carriers 20 during the advancing movement of the pusher bar 28.

The pushers 32 are provided with suitable stops 36 which are adapted to engage the lower edge of the depending web of the pusher bar to prevent pivoting movement of the pushers during the advancing movement. During the retracting movement of the pusher bar, however, the pushers 32 pivot on coming in contact with a work carrier to an inoperative position as shown in phantom in FIGURE 2 enabling them to pass over the top of and drop down behind a work carrier preparatory to the next advancing movement of the pusher bar.

Reciprocation of the pusher bar 28 and the pushers 32 thereon to and from a retracted position as shown in FIGURE 4 to a fully advanced position as shown in FIGURE 2, can be achieved by any suitable mechanism such as a double-acting fluid actuated cylinder 38 as shown in FIGURE 1 mounted in the elevator chassis 14 and connected by suitable linkage 40 to the pusher bar. The actuation of the transfer cylinder 38 and the corresponding advancing and retracting movement of the pusher bar is coordinated with the operating sequence of the conveying machine by a central control system. The length of the advancing and retracting stroke of the transfer cylinder 38 can be suitably controlled by a limit switch LS1 mounted on the elevator chassis 14 and actuable by actuators 42 on the pusher bar as shown in FIGURE 3 when the fully advanced and retracted positions are attained.

In accordance with the structure of the conveying machine as hereinbefore described, the work racks 18 are loaded on the work carriers 20 and are thereafter intermittently advanced along the fixed rail section 24 and movable rail sections 26 during which time the work racks are subjected to a prescribed treating sequence. When the elevator chassis 14 is in the lowered position, the advancement of the transfer mechanism effects advancement of each of the work carriers along the fixed rail sections 24 and movable rail sections 26 which are disposed in end-to-end alignment forming therewith a continuous rail. When the elevator chassis 14 is in the raised position as shown in FIGURE 1, the advancing movement of the transfer mechanism effects advancement of only those work carriers supported on the movable rail sections 26 whereby these work carriers and the work racks 18 suspend therefrom are advanced above the tank partitions 22 to the next adjacent treating station.

In accordance with a typical operating cycle of the machine and with the elevator chassis in the raised position, the transfer cylinder is actuated whereby the work carriers and work racks suspended therefrom are advanced along the movable rail sections to a position above the next treating station. After the completion of the advancing stroke of the pusher bar 28 as signaled by the actuation of transfer limit switch LS1, the elevator chassis is lowered whereby the work racks suspended from the movable rail sections are lowered into the treating solutions in the tanks 16 therebelow. A suitable dwell timer is incorporated in the central control system of the conveying machine which commences to time a preselected down dwell period after the chassis attains the lowered position and whereby the work racks are subjected to a predetermined treatment period. At the completion of the down dwell period, the transfer cylinder 38 is actuated causing the pusher bar 28 to move from the advanced position to the retracted position. At the completion of the retracting movement as signaled by the actuation of transfer limit switch LS1, the transfer cylinder 38 is again actuated causing the pusher bar to commence its advancing movement whereby the work carriers are engaged by the pushers 32 and are advanced along the fixed rail sections 24 and movable rail sections 26 to the next adjacent treating station.

At the completion of the advancing movement of the pusher bar 28 as signaled by the transfer limit switch LS1, the elevator chassis 14 is elevated to the fully raised position after which the pusher bar is again retracted and subsequently advanced to advance those work carriers on the movable rail section above the treating tanks 16 to the next adjacent treating station. The foregoing sequence continues whereby each of the work rack 18 are subjected to a predetermined treating cycle.

As hereinbefore indicated, it is desirable that the advancement of the work carriers 20 from one station to the next station be achieved as rapidly as possible which has heretofore presented the problem of over-travel of the work carriers. In addition, any vibrations in the elevating or lowering movement of the elevator chassis as well as vibration imposed on the workpieces during their treatment has occasioned inadvertent and undesirable rearward or forward movement or drift of the work carriers along the movable and fixed supporting rail sections effecting misalignment of the work racks 18 suspended therefrom.

In accordance with the improved carrier stop mechanism comprising the present invention, the work carriers 20 and the work racks 18 suspended therefrom are positively engaged when they attain the predetermined advanced position preventing any undesirable drift thereof from that position until the pusher bar is retracted preparatory to the next advancing movement. The carrier stop mechanism as may be best seen in FIGURES 1-5, comprises an elongated member or cam 44 movably mounted for swinging movement about a pivot pin 46 which is secured to a stationary frame member 48 connected to the elevator chassis 14. Additional cams 44 are pivotally mounted in a similar manner adjacent to and longitudinally of the fixed rail sections for engaging the work carriers thereon and maintaining them in the appropriate advanced position. Since each of the carrier stop mechanisms are identical, only one need be described in detail for a complete understanding of the present invention.

In the specific arrangement shown in the drawings, the cam 44 is positioned inwardly of and in clearance relationship to the pusher bar 28 and the pushers 32 mounted thereon. The frame member 48 can be provided with a plurality of longitudinally spaced apertures in which the pivot pin 46 can be disposed for adjusting the position of the cam 44 relative to the advance position of the work carriers in accordance with the desired stroke of the transfer mechanism.

The lower portion of the cam 44 is provided with an inwardly extending notch 50 defining a first abutment or surface 52 which is adapted to be disposed in blocking position relative to a trailing edge portion of the work carrier 20 and a second abutment or surface 54, which is adapted to be disposed in blocking position relative to a leading edge portion of the work carrier 20 preventing undesired rearward or forward drift of the work carrier along the supporting rail. The specific longitudinal spacing of the first abutment 52 and the second abutment 54 can be varied consistent with the specific type of work carrier 20 employed on the conveying machine.

The cam 44 is movable to and from an operative or engaging position as shown in FIGURE 2 to an inoperative or clearance position as shown in FIGURE 4 out of engagement with the work carrier 20 enabling unobstructed advancement of the work carrier to the next treating station. The movement of the cam 44 from the operative engaging position to the inoperative clearance position is achieved in response to the retracting movement of the pusher bar 28 from the advanced position as shown in FIGURE 2 to a retracted position as shown in FIGURE 4 and during which movement an actuator pin 56 affixed to and extending rearwardly and laterally of the pusher bar 28 engages a lifting cam surface 58 along the upper edge portion of the cam 44. The cams 44 are shown in FIGURE 4 with the actuator pin 56 positioned along the lifting cam surface 58 wherein the first and second abutments 52, 54 of the notch 50 are disposed in clearance position relative to the upper portion of the work carrier 20 enabling unobstructed advancing movement of the work carriers in response to the next advancing movement of the pusher bar 28.

As the pusher bar is advanced from the fully retracted position as shown in FIGURE 4, the pushers 32 engage the work carriers 20 moving them toward the right as viewed in FIGURE 4 in the direction of the arrow toward an intermediate position as shown in phantom. During the initial advancing movement of the pusher bar, the actuator pin 56 retains the cam 44 in the elevated clearance position for a sufficient interval to enable unobstructed advancement of the work carrier beyond the first abutment 52 and second abutment 54 thereon. When the actuator pin 56 passes beyond the lifting cam surface 58, the cam again moves toward the operative engaging position in response to biasing means which in the specific embodiment shown comprises the gravitational force thereon. As the work carrier moves beyond the cam 44 which is thereafter released by the actuator pin 56, the cam 44 swings downwardly and is retained in the engaging position by a suitable stop 60 on the frame member 48 preventing any further downward swinging movement of the cam.

As the work carrier continues to be advanced toward the next treating position, it approaches the next cam 44 as shown in FIGURE 5 whereby the work carrier coacts with a lower cam surface 62 of the cam 44 effecting movement of the cam to an intermediate clearance position as shown in FIGURE 5. The cam 44 is progressively elevated toward the intermediate clearance position enabling the work carrier 20 to be advanced beneath and beyond the first abutment 52 toward the second abutment 54. In accordance with the preferred construction of the carrier stop mechanism as shown in FIGURE 5, the second abutment 54 is preferably of a greater length so that while the cam is in the intermediate clearance position, at least the lower portion of the second abutment 54 is disposed in the blocking position. Further advancement of the work carrier 20 to a point where the leading edge portion thereof is disposed in blocking relationship against the second abutment 54, enables the gravitational force acting on the cam 44 to urge the cam to the operative position as shown in FIGURE 2 in which positive engagement of the work carrier is achieved.

As will be noted in FIGURE 5, the actuator pin 56 during the advancing movement of the pusher bar 28 moves along and above the cam 44 eventually coming in contact with an upper cam surface 64 preventing upward movement of the cam beyond the intermediate clearance position. By virtue of this arrangement, the cam 44 cannot be deflected beyond the intermediate clearance position assuring that the second abutment 54 remains in blocking position as shown in FIGURE 5 preventing any over-travel of the work carrier 20. After the work carrier has attained the fully advanced position wherein it is disposed within the notch 50 of the cam 44, the overlying position of the actuator pin 56 prevents the cam 44 from being inadvertently moved toward the clearance position until the pusher bar is retracted at the completion of a predetermined treatment time. When the pusher bar commences its retracting movement the actuator pin 56 is retracted beyond the cam 44 and eventually coacts with the lifting cam surface 58 of the next adjacent carrier stop mechanism effecting lifting movement thereof to the clearance position shown in FIGURE 4.

It will be appreciated from the foregoing that the positive engagement and locking of the work carriers in the predetermined advanced position, is achieved automatically and in response to the controlled advancing and retracting movement of the pusher bar in accordance with the sequence as controlled by the control system of the principal conveying machine. The cams 44 disposed adjacent the fixed rail sections 24 are similarly actuated in response to the advancement of the work carriers and the reciprocating movement of the pusher bar 28. It will be noted, however, that positive locking of these cams by the actuator pins 56 occurs only at such times that the elevator chassis is in the lowered position.

An alternate satisfactory embodiment of a carrier stop mechanism incorporating the features hereinbefore set forth, is shown in FIGURES 6 and 7 wherein a cam 66 is mounted on the chassis and is swingable about a pivot 68 in a substantially horizontal plane from an operative engaging position to a clearance position laterally spaced therefrom. The cam 66 is of substantially the same configuration as the cam 44 previously described including a first abutment 52a, a second abutment 54a, and a notch 50a which are adapted to be disposed in overlying engagement with the rearward edge portions of the work carrier 20. An actuator pin 56a connected to the pusher bar 28 extends downwardly therefrom and is adapted to coact with a lifting cam surface 58a and an upper cam surface 64a for lifting the cam 66 from an engaging position as shown in solid lines in FIGURE 7 to a clearance position as shown in phantom in a manner identical to that hereinbefore described. Similarly, the cam 66 is provided with a lower cam surface 62a which is adapted to coact with a work carrier 20 in response to the advancement thereof for moving the cam 66 to an intermediate position just prior to the completion of the advancing movement.

In the arrangement as shown in FIGURES 6 and 7, a helical coil spring 70 which is seated against a stationary member 72 of the elevator chassis or on the central frame for those cams positioned adjacent to the fixed rail sections 24 and is disposed with the other end thereof in bearing contact against the cam 66. In order to provide a sufficient bearing surface against which the coil spring 70 seats, the cam 66 is preferably provided with an enlarged upstanding flange 74, the side surfaces of which define the lifting cam surface 58a and the upper cam surface 64a.

Still another alternate satisfactory arrangement of the positive locking carrier stop mechanism comprising the present invention is shown in FIGURE 8 wherein a two-piece cam 76 is shown comprising a member 76a and a member 76b pivoted to a common pivot pin 46b and having a plan configuration corresponding to that of the integral cams 44 and 66 previously described. The member 76a as shown in FIGURE 8 incorporates a first abutment 52b at the end thereof adapted to be positioned in blocking relationship relative to a trailing edge portion of a work carrier. The member 76a is also provided with a lower cam surface 62b which is adapted to coact with a work carrier during the advancing movement thereof for independently pivoting the member 76a and the first abutment 52b thereon toward an intermediate clearance position. The second member 76b similarly is independently movable by the actuator pin 56b to a clearance position in response to retraction of the pusher bar in a manner as hereinbefore described as a result of the coaction of the actuator pin with a lifting cam surface 58b along the upper edge thereof. Similarly, the second member 76b is maintained in the lower operative engaging position by the actuator pin 56b positioned in overlying relationship on the upper cam surface 64b in the same manner as previously described.

While the preferred form of the carrier stop mechanism is shown in FIGURES 1–5, the alternate embodiments shown in FIGURES 6–8 can also be satisfactorily employed consistent with the specific construction and operating characteristics of an automated conveying apparatus on which they are to be mounted.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a conveying machine including a frame having a rail thereon on which a work carrier is movably mounted and intermittently advanced therealong by reciprocable transfer means to successive longitudinally spaced work stations, the improvement comprising a carrier engaging mechanism stationarily positioned at one of the stations for engaging a work carrier at the completion of the advancing movement of the transfer means preventing inadvertent forward and rearward travel thereof relative to said station, said mechanism comprising a first member and a second member mounted on the frame and disposed in spaced relationship longitudinally of the rail, said first member movable from a blocking position relative to the trailing edge portion of a work carrier to a clearance position spaced therefrom responsive to advancement of a work carrier, said second member movable from a blocking position relative to the leading edge portion of a work carrier to a clearance position spaced therefrom responsive to the retracting movement of the transfer means, and means biasing said first and said second member toward said blocking position.

2. In a conveying machine including a frame having a rail thereon on which a work carrier is movably mounted and intermittently advanced thereon by reciprocable transfer means to successive longitudinally spaced work stations, the improvement comprising a carrier engaging mechanism stationarily positioned at one of the stations for engaging a work carrier at the completion of the advancing movement of the transfer means preventing inadvertent forward and rearward travel thereof relative to said station, said mechanism comprising a first member pivotally mounted on the frame and movable from a blocking position relative to a trailing edge portion of a work carrier to a clearance position spaced therefrom responsive to the coaction with a work carrier during the advancing movement thereof toward said station, said second member movable from a blocking position relative to a leading edge portion of a work carrier to a clearance position spaced therefrom responsive to coacting means on the transfer means and said second member during the retracting movement of the transfer means enabling unobstructed advancement of a work carrier to the next station on the next advancing movement of said transfer means, and means urging said first and said second member toward said blocking position.

3. In a conveying machine the combination comprising a frame, a rail on said frame extending along a plurality of work stations, a work carrier movably mounted on said rail, reciprocable transfer means disposed longitudinally of said rail for intermittently advancing said carrier along said rail during the advancing movement thereof to successive stations, a carrier engaging mechanism stationarily positioned adjacent to at least one of the stations and including a first member and a second member movably mounted on said frame for engaging said carrier at the completion of the advancing movement of said transfer means preventing inadvertent forward and rearward travel thereof relative to a station, said first member including an engaging portion adapted to be positioned in blocking relationship relative to a trailing edge portion of said carrier and movable to a clearance position laterally spaced therefrom responsive to coaction with said carrier during the advancing movement thereof to a station, said second member including an engaging portion adapted to be disposed in a blocking position relative to a leading edge portion of said carrier and movable to a clearance position laterally spaced therefrom responsive to coaction with said transfer means during the retracting movement thereof, and means for urging said first and said second member and said engaging portions thereon toward said blocking position.

4. In a conveying machine the combination comprising a frame, a rail on said frame extending along a plurality of work stations, a work carrier movably mounted on said rail, reciprocable transfer means disposed longitudinally of said rail for intermittently advancing said work carrier therealong to successive stations, an engaging mechanism stationarily positioned adjacent to at least one of the stations and including a cam movably mounted on said frame and formed with a first and a second abutment disposed in longitudinally spaced relationship and adapted to be disposed in blocking position relative to the trailing edge and leading edge portions respectively, of said work carrier preventing inadvertent movement thereof along said rail relative to a station; said cam including a first surface adapted to coact with said work carrier during the advancing movement thereof toward a station for moving said cam and said first abutment to a clearance position and a second surface adapted to coact with means on said transfer means during the retracting movement thereof to move said second abutment to a clearance position out of the path of said work carrier enabling unobstructed advancement thereof to the next station, and means for urging said cam and said first and second abutment thereon, toward said blocking position.

5. In a conveying machine the combination comprising a frame, a rail on said frame extending longitudinally of a plurality of work stations, a work carrier movably mounted on said rail, reciprocable transfer means disposed longitudinally of said rail for intermittently advancing said work carrier therealong during the advancing movement thereof to successive stations, an engaging mechanism stationarily positioned adjacent to at least one of the stations and including a cam pivotally mounted on said frame and formed with a first and a second abutment disposed in longitudinally spaced relationship and adapted to be disposed in blocking position relative to the trailing edge and leading edge portions respectively, of said work carrier preventing inadvertent movement thereof along said rail from a predetermined advanced position adjacent the station, said cam including a first surface adapted to coact with said work carrier during its movement toward the advanced position for moving said cam and said first abutment to a clearance position and a second surface adapted to coact with means on said transfer means during a portion of the retracting movement thereof to pivot said second abutment to a clearance position out of the path of said work carrier enabling unobstructed advancement thereof to the next station, and means for urging said cam and said first and second abutment thereon toward said blocking position.

6. In a conveying machine the combination comprising a frame, a rail on said frame, a work carrier movably mounted on said rail, reciprocable transfer means disposed longitudinally of said rail for intermittently advancing said work carrier along said rail during the advancing movement thereof, an engaging mechanism including a cam pivotally mounted on said frame and formed with a first and a second abutment disposed in longitudinally spaced relationship and adapted to be disposed in blocking position relative to the trailing edge and leading edge portions, respectively, of said work carrier preventing undesired movement thereof along said rail; said cam formed with a first surface adapted to coact with said work carrier during the advancing movement thereof for pivoting said cam and said first abutment to a clearance position, coacting means on said transfer means and movable thereby during the advancing movement thereof to restrict the pivoting movement of said cam beyond a preselected clearance position of said first abutment, said cam formed with a second surface adapted to coact with said coacting means during retraction of said transfer means for moving said cam and said second abutment thereon to a clearance position out of the path of said work carrier enabling unobstructed advancement thereof on the next advancing stroke of said transfer means, and means for urging said cam and said first and second abutment thereon toward said blocking position.

7. The conveying machine described in claim 6 wherein said means for urging said cam toward said blocking position comprises resilient means mounted on said frame and coacting with said cam.

8. The conveying machine as described in claim 6 wherein said cam is pivotable in a substantially vertical plane and wherein said means for urging said cam toward said blocking position comprises the gravitational force on said cam.

References Cited in the file of this patent
UNITED STATES PATENTS

| | | |
|---|---|---|
| 2,881,711 | Davis | Apr. 14, 1959 |
| 3,024,740 | Peras | Mar. 13, 1962 |

UNITED STATES PATENT OFFICE
CERTIFICATE OF CORRECTION

Patent No. 3,149,581                      September 22, 1964

John V. Davis

It is hereby certified that error appears in the above numbered patent requiring correction and that the said Letters Patent should read as corrected below.

Column 1, line 20, for "of" read -- or --; line 23, after "sufficient" insert -- to --; same column 1, line 39, for "2,897,010" read -- 2,987,010 --; column 4, line 50, for "suspend" read -- suspended --; column 5, line 10, for "rack" read -- racks --.

Signed and sealed this 10th day of August 1965.

(SEAL)
Attest:

ERNEST W. SWIDER                             EDWARD J. BRENNER
Attesting Officer                               Commissioner of Patents